(No Model.)

G. B. HUMPHREY.
PNEUMATIC TIRE.

No. 561,512. Patented June 2, 1896.

WITNESSES:
Ralph Daub
H. J. Levis

INVENTOR
G. B. Humphrey
BY O. D. Levis
ATTORNEY.

UNITED STATES PATENT OFFICE.

GEORGE B. HUMPHREY, OF DERRY STATION, PENNSYLVANIA.

PNEUMATIC TIRE.

SPECIFICATION forming part of Letters Patent No. 561,512, dated June 2, 1896.

Application filed September 7, 1895. Serial No. 561,738. (No model.)

*To all whom it may concern:*

Be it known that I, GEORGE B. HUMPHREY, a citizen of the United States, residing at Derry Station, in the county of Westmoreland and State of Pennsylvania, have invented certain new and useful Improvements in Pneumatic Tires; and I do hereby declare the following to be a full, clear, and exact description of the invention, such as will enable others skilled in the art to which it pertains to make and use the same, reference being had to the accompanying drawings, which form a part of this specification.

This invention relates to certain new and useful improvements in pneumatic tires, and has primarily for its object the provision of novel means, whereby attaching of the outer tire may be dispensed with.

The invention has for its further object to design a clamp that will automatically close when sufficient air has been pumped into the tire; furthermore, to construct a device of the above-referred-to class that will be extremely simple in its construction, strong, durable, and comparatively inexpensive to manufacture.

With the above and other objects in view the invention finally consists in the novel construction, combination, and arrangement of parts to be hereinafter more particularly described, and specifically pointed out in the claim.

In describing the invention in detail reference is had to the accompanying drawings, forming a part of this specification, and wherein like numerals of reference indicate similar parts throughout both views, in which—

Figure 1:
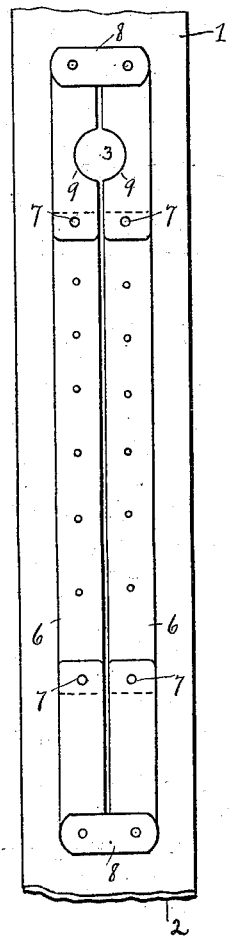
Figure 2:
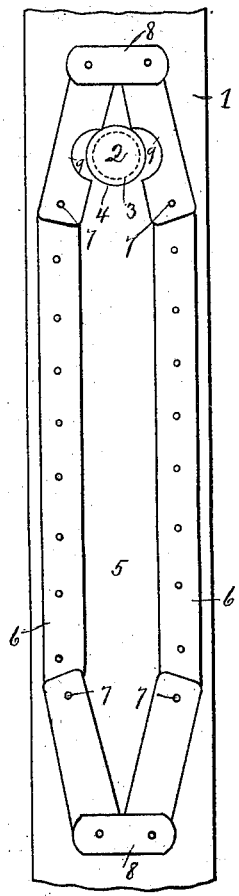

Figure 1 is a plan view of a pneumatic tire with my improvement attached thereto, showing the clamp in a closed position. Fig. 2 is a similar view of the clamp in an open position.

In the drawings, 1 indicates the outer tire; 2, the inner tire.

3 represents the aperture of the inner tire, adapted to receive the valve 4.

The reference-figure 5 represents a slit cut on the underneath side of the outer tire. Metal straps 6 6 are riveted to the outer tire and are hinged at 7 7 and are pivotally connected together at the ends by means of a strap 8 and riveted to the outer tire, the device when open forming a diamond-shaped clamp. Near one end of the straps, between the hinges and the end of said straps, each strap is provided with a semicircular cut-away portion 9 9, said portion being adapted to encircle the valve 4 when the clamp is in position.

For the purpose of illustrating the device let it be assumed that the parts are in position, as shown in Fig. 1 of the drawings. As the air is pumped through the valve, inflating the inner tire, the outer tire will expand and cause the metal straps to be drawn together. The valve is then closed and the clasp placed in proper position, thereby securely locking the device.

It will be obvious that many advantages are obtained by the use of the above-described device, and it will be noticed that various changes may be made in the details of construction and arrangement of parts without departing from the general spirit of my invention.

Having fully described my invention, what I claim as new, and desire to secure by Letters Patent, is—

The pneumatic-tire clamp consisting of the metallic straps arranged one upon each side of a slit in the outer tire and hinged or pivoted at their ends to separate strap-sections, connected at their outer ends to additional strap-sections, substantially as set forth.

In testimony that I claim the foregoing I hereunto affix my signature this 24th day of July, A. D. 1895.

GEORGE B. HUMPHREY. [L. S.]

In presence of—
S. S. MOORHEAD,
G. B. MEYERS.